United States Patent [19]

Ohnishi et al.

[11] 4,224,360
[45] Sep. 23, 1980

[54] METHOD OF WELDING FOR EXFOLIATION PREVENTION OF STAINLESS STEEL WELD-OVERLAY

[75] Inventors: Keizo Ohnishi; Takao Adachi; Akiyoshi Fuji; Ryuichi Chiba, all of Muroran, Japan

[73] Assignee: The Japan Steel Works, Inc., Tokyo, Japan

[21] Appl. No.: 10,774

[22] Filed: Feb. 9, 1979

[30] Foreign Application Priority Data

Feb. 9, 1978 [JP] Japan .................................. 53-12978
Jul. 19, 1978 [JP] Japan .................................. 53-07093

[51] Int. Cl.$^2$ ........................ B23K 9/04; B21D 51/24
[52] U.S. Cl. ..................................... 427/239; 427/405; 219/76.12; 220/3; 220/456; 428/685
[58] Field of Search ..................... 428/661, 662, 685; 220/3, 456; 219/76.12; 427/34, 239, 405, 427

[56] References Cited

U.S. PATENT DOCUMENTS 2,789,049   4/1957   DeLong .............................. 428/685
4,110,514   8/1978   Nicholson ........................... 428/685

FOREIGN PATENT DOCUMENTS 1120242  12/1961  Fed. Rep. of Germany ........ 219/76.12
2542081   3/1977  Fed. Rep. of Germany ........ 219/76.12
4615409   4/1971  Japan .................................... 219/76.12

Primary Examiner—Ralph S. Kendall
Attorney, Agent, or Firm—Sughrue, Rothwell, Mion, Zinn and Macpeak

[57] ABSTRACT

A welding method for stainless steel overlays is disclosed wherein a welded stainless steel overlay is prevented from exfoliating out of an inner surface of a high pressure vessel. Hydrogen exists at a partial pressure of less than 150 kg/cm$^2$ and a temperature less then 450° C. in the pressure vessel. At least one low alloy steel weld-overlay is preliminarily welded over the inner surface of the pressure vessel. The preliminarily low alloy steel weld-overlay is composed of similar composition to the base metal of the vessel, containing niobium and/or nickel. Thereafter, at least one customary ferritic steel or austenitic steel weld-overlay is welded thereon.

5 Claims, 5 Drawing Figures

METHOD OF WELDING FOR EXFOLIATION PREVENTION OF STAINLESS STEEL WELD-OVERLAY

BACKGROUND OF THE INVENTION

This invention relates to a method of welding for preventing "a crack" which is generated in an interface between an weld overlaid metal and a basic metal in a high pressure vessel. Such vessels generally contain hydrogen having high temperature and high pressure and an inner surface of the vessel is welded with a stainless steel. (The crack will be hereinafter simply referred to as an exfoliation or a disbonding.)

More specifically, this invention provides an excellent method of welding in which resistance to exfoliation, caused by high temperature and high pressure hydrogen is remarkably enhanced by selecting a particular material for a preliminary weld overlay of stainless steel.

Hydrogen having a high temperature and a high pressure is widely used in reaction vessels for ammonia production, methanol production and petrochemical refining. In order to prevent corrosion of the inner surface of such a vessel due to the substance contained therein, an austenitic or ferritic steel layer is generally weld-overlaid. (This welding process will be simply referred to as overlay-welding.) However, hydrogen may be diffused from the inner surface of the vessel to the internal portion thereof. Furthermore, supersaturated hydrogen due to a temperature drop, for example during a shut-down, is left in the vessel. Accordingly, the interface between the stainless steel and the base metal tends to be brittle to thereby generate an exfoliation or disbonding. Such a problem is a serious aspect of maintaining a pressure vessel in accordance with general safety criteria.

The factors of exfoliation are as follows:

(1) A residual strain exists because in a difference of the heat-expansion coefficients of an austenitic stainless steel and a base metal made of a ferritic steel.

(2) A hard alloy layer having a high sensitivity of hydrogen brittleness (such as martensite and low bainite) is produced.

(3) Hydrogen solubility of stainless steel is considerably different from that of the base metal. Accordingly, during a temperature drop, an internal pressure due to saturated hydrogen tends to be generated in the interface.

The above-described factors generally combine causing the exfoliation or disbonding.

Various stainless overlay welding methods were examined by the inventors. As a result, it has been recognized that a method excels where ferritic stainless steel is overlaid by welding on the basic material and thereafter at least one ordinary austenitic stainless steel is overlaid also by welding. Such a method has been disclosed in the published, unexamined Japanese Patent Application No. 52-138935.

An object of that application is to improve the above-described factors (1) and (3). Specifically, a residual strain is reduced by overlay-welding of one ferritic steel layer, on the basic material, having the same crystal composition as that of the basic material. Exfoliation is prevented by the hydrogen solubility.

Further, after the various trails and the detailed research of the exfoliation process, the inventors have found that the exfoliation tends to be generated by heat-processing after the welding. That is, if a heat-process is carried out at a temperature between 650° to 700° C. for an extended time after the overlay-welding, carbon contained in the basic material is diffused and transferred to the austenitic or ferritic stainless steel and then the decarbonized layer is formed in the basic material while carbon is cemented into the fused layer. The stainless steel thereby forms a hard carbonized layer. As a result, when hydrogen permeates through the stainless steel overlayer, exfoliation or disbonding is generated in the fused and carbonized layer and in the sensitive interface of the stainless steel overlaid metal thereby cooperating with the factors (1) to (3).

SUMMARY OF THE INVENTION

An object of the present invention is to provide a method of overlay-welding, that prevents exfoliation or disbonding of stainless steel weld metal due to hydrogen through the above-noted effects.

The inventors have found that a weld metal for a first layer should be a low alloy steel containing niobium and having a similar composition to the basic material. The first layer is overlaid forming at least one layer by welding, and as a weld metal for a second layer, a stainless steel (austenitic or ferritic) is overlaid on the first weld metal by welding. As a result, exfoliation or disbonding due to hydrogen can be prevented even with heat processing after the welding.

Furthermore, the present inventors have found that a weld metal for a first layer may be a low alloy steel having a similar composition to the basic material and containing niobium and nickel overlaid by welding to form at least one layer. The weld metal for a second layer is the above-described stainless steel overlaid by welding. As a result, exfoliation or disbonding due to hydrogen can be prevented.

As mentioned above, in a high temperature and pressure vessel containing hydrogen having a partial pressure of less than 150 kg/cm$^2$ and a temperature of less than 450° C., the weld metal for a first layer should be a low alloy steel having a similar composition to the basic material and containing niobium. It is preliminarily overlaid to form at least one layer or as a weld metal for a first layer, then a low alloy steel having a similar composition to the basic material and further containing niobium and nickel is preliminarily overlaid to form at least a second layer. Finally on the overlaid second layer, an ordinary austenitic or ferritic stainless steel is further overlaid by welding to form at least a third layer.

This invention will be described with respect to the drawings and the description of the preferred embodiment that follows.

DETAILED DESCRIPTION OF THE INVENTION

Figure 1:
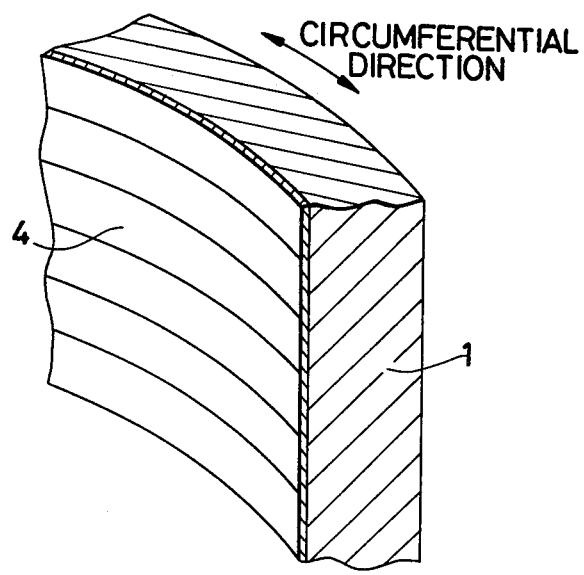
FIG. 1 shows a partial cross sectional view of a pressure vessel made by forging and overlay-welding on an inner surface thereof according to the present invention.

The present invention will be hereinafter described in detail.

A preliminary weld-overlay metal is typically a low alloy steel selected and composed of carbon of 0.1% or less, silicon of 1.0% or less, manganese of 1.0% or less, chromium of 3.5% or less, molybdenum of 1.5% or less, niobium from eight times carbon in quantity to 1.2%, and the remainder, iron and impure material. According to the present invention, since niobium contained in a low alloy steel, which is a weld metal, serves to stabilize carbon in the steel, the diffusion of carbon to the stainless steel weld metal during the heat process can be prevented without forming a hard carbide layer in the fused layer therebetween. Also, a granular carbide layer having a high sensitivity of hydrogen brittleness is not generated in the stainless steel weld metal. Accordingly, exfoliation or disbonding can be prevented.

Another preliminary weld-overlay metal typically contains niobium and nickel. A low alloy steel is composed of carbon 0.1% or less, silicon of 1.0% or less, manganese of 1.0% or less, chrome of 3.5% or less, molybdenum of 1.5% or less, niobium from eight times carbon in quantity to 1.2% or less, nickel of 1.0% or less and the remainder of iron and impure material. In this case, as mentioned above, since niobium contained in the low alloy steel, which is a weld metal, serves to stabilize carbon in the steel, the diffusion of carbon to the stainless steel weld metal during the heat process can be prevented without forming a hard carbide layer in the fused layer therebetween. Furthermore, in this case, since nickel is contained in the weld metal, the weld metal can have excellent ductility and tenacity. As mentioned above, the intergranular carbide layer having a high sensitivity of hydrogen brittleness is not produced thereby preventing exfoliation.

The present invention will be described on the basis of the following Examples.

First, the basis for the formulation of the composition of weld-metal as described above will be described.

Carbon is required to maintain the mechanical strength of weld metal. However, the upper limit of such steel is generally determined to be less than 0.08% taking weldability into consideration. When the stainless steel is overlaid by welding on at least the second layer and thereafter, the heat process is carried out, and the sensitivity of exfoliation due to hydrogen is increased by the function of carbon. In view of this, the amount of carbon must be reduced to the maximum extent possible. However, considering the amount of carbon which invades from the basic material, the upper limit thereof is determined preferably to be 0.1%.

Silicon and manganese are used as deoxidizing agents and are required to maintain the mechanical strength of weld metal. However, the excessive amounts thereof damage the tenacity and the weldability of the material. Accordingly, the upper limits thereof are determined to be about 1.0%.

Chrome and molybdenum are required to maintain the mechanical strength under high temperature and to maintain resistance against the hydrogen corrosion due to the hydrogen having a high temperature and a high pressure. With respect to hydrogen corrosion, increasing the amounts thereof will make the material stronger to increase the resistance. However, since the vessel is used under the conditions where the partial pressure of hydrogen is 150 kg/cm$^2$ or less and the temperature thereof is 450° C. or less, the upper limit of chrome is determined to be 3.5% and molybdenum 1.5%.

Niobium is required to stabilize carbon as a carbide. To sufficiently stabilize carbon in the weld metal, the required amount of niobium is 8 to 10 times the amount of carbon. However, when niobium is contained excessively, the tenacity of the weld metal will deteriorate. Therefore, the upper limit thereof is determined to be 1.2%.

Nickel is not necessarily required. However, nickel is required to enhance the mechanical strength and tenacity of ferrite. In the present invention, the niobium is used to improve the mechanical strength and the tenacity of the weld metal. That is, the amount of carbon contained in the preliminary weld metal containing niobium is reduced to under the 0.1% value taking weldability into consideration. Therefore, the mechanical strength of the weld metal is generally weaker than that of the basic material. Niobium which is added to stabilize carbon reduces the ductility and the tenacity of the weld metal. Therefore, nickel is used to compensate for such a defect. By the examination of the mechanical strength due to the additional amount of nickel, the amount thereof is desirably less than 1.0%. If the amount of the nickel exceeds this upper limit, the sensitivity of the tempering brittleness is enhanced and the weldability deteriorates. Accordingly the upper limit is determined at less than 1.0%.

To demonstrate exfoliation effects of the stainless steel overlay according to the present invention, exfoliation examination results of a stainless steel overlay exposed to hydrogen having a high pressure and high temperature will be described.

Figure 2:
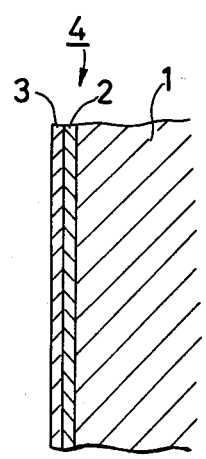
FIG. 2 shows a cross section of the barrel portion of the pressure vessel shown in FIG. 1 in the radial direction.

FIG. 1 shows a part of a barrel portion of a forged steel pressure vessel which is overlaid on the inner surface thereof by welding by use of a strip electrode (thickness of 0.4 mm, width of 75 mm) not shown. Reference numeral 1 designates a basic material of forged steel. Reference numeral 4 designates an overlaid weld metal layer. FIG. 2 shows a cross section in the thickness direction of the vessel. An overlay weld metal layer 4 is formed by weld overlaying on the basic material a low alloy steel 2 having a composition similar to the basic material 1 as a first layer and by weld overlaying thereon a stainless steel 3 as a second layer.

Tables 1 and 2 show materials and chemical compositions of various Examples of the layers which are welded as mentioned above. Examples 1 to 6 are related to the present invention while Comparisons 1 and 2 are also listed in Table 2.

To demonstrate the exfoliation resistances of the overlay steels against hydrogen, a sample strip is produced by heat processing of 5 to 100 hours at 690° C. after the overlay weld. The sample strip is disposed in an autoclave and maintained at hydrogen pressure of 150 kg/cm$^2$ and at hydrogen temperature 450° C. for 24 hours. The strip is then abruptly cooled in a normal ambient atmosphere. Exfoliation or disbonding appears several hours after the temperature thereof becomes equal to room temperature. This can be clearly recognized by supersonic damage detection examination.

Figure 3:
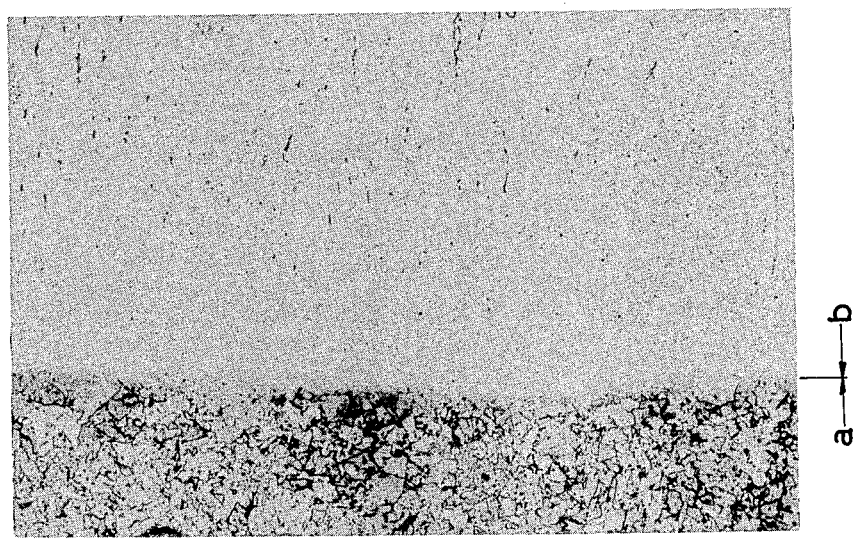
FIG. 3 shows a microscopic photograph of an interface between the first overlaid low alloy steel and the second overlaid stainless steel, according to the Example 1.
Figure 4:
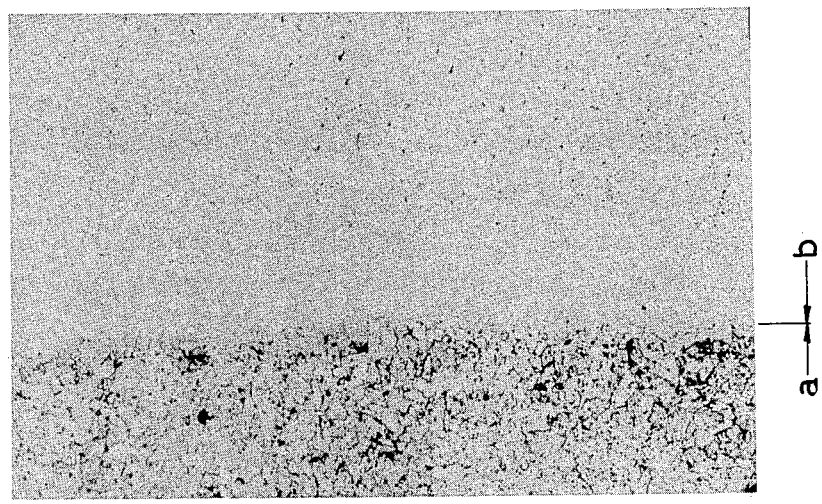
FIG. 4 shows a microscopic photograph of an interface between the first overlaid low alloy steel and the second overlaid stainless steel, according to the Example 4.
Figure 5:
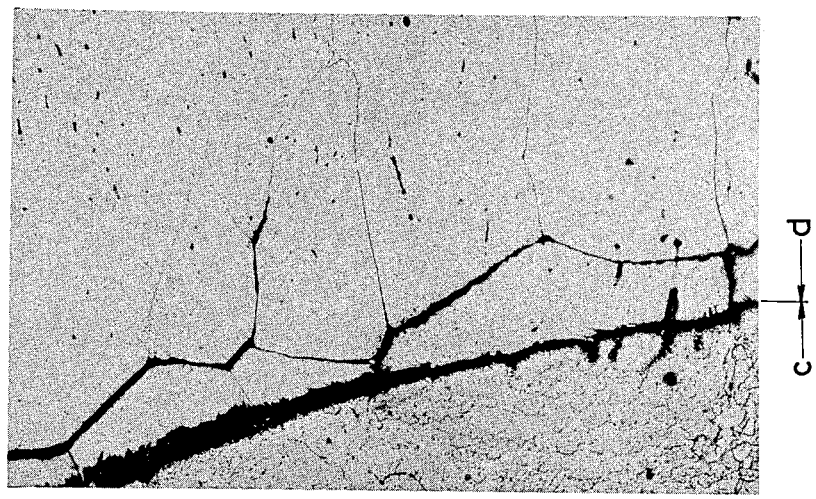
FIG. 5 shows a microscopic photograph of an interface between the basic material and the first overlaid stainless steel, according to the comparison 2.

The experimental results are shown in Tables 3 and 4. Exfoliation is not generated in the stainless steel overlay steels of the Examples 1 to 6 according to the present invention. Conversely, in the stainless steel overlay steels of the prior art, according to both of the comparisons 1 and 2, exfoliation is generated in the time duration from 5 to 100 hours during the after-heat process. The longer the time duration of the after-heat process the sooner exfoliation will start and the wider the exfoliation area becomes during the disposal at room temperature. This phenomenon is well known. The microscopic views after the exfoliation experiments are shown in FIGS. 3 and 4. FIG. 3 shows a microscopic photograph (×400 magnification) of an interface between a first overlay layer (which is designated by 2¼ Cr - 1 Mo Nb: a) and a second overlay layer (which is designated by Type 347: b) in Example 1 of Table 1 according to the present invention. In this case, exfoliation is not seen. FIG. 4 shows a microscopic photograph (×400 magnification) of an interface between a first overlay layer (2¼ Cr - 1 Mo Nb Ni: a) and a second overlay layer (Type 347: b) in Example 4 of Table 2. Here again, exfoliation is not seen.

Examples 4 to 6, which comprise niobium and nickel as underlay weld metals, examine the bending ductility and side bending experiments as compared with Comparisons 1 and 2. The results are shown in Table 4.

More specifically, the bending experiments are carried out under the following conditions. An experimental sample having a thickness of 10 mm is produced. The inner diameter of the bending is 20 mm. The bending angle is 180°.

The exfoliation and side bending experiments are shown in Table 4. As shown in Table 4, exfoliation was not found in the stainless steel overlay steels of Examples 4 to 6 according to the present invention. No problems were incurred in the bending experiments.

TABLE 1

| | CHEMICAL COMPOSITION (%) OF STAINLESS STEEL OVERLAY STEEL | | | | | | | | | | |
|---|---|---|---|---|---|---|---|---|---|---|---|
| | Class | Material | C | Si | Mn | P | S | Ni | Cr | Mo | Nb |
| Example 1 | Second Overlay | Type 347 | 0.043 | 0.65 | 1.80 | 0.021 | 0.011 | 10.40 | 19.42 | — | 0.84 |
| | First Overlay | 2¼ Cr-1MoNb | 0.06 | 0.43 | 0.70 | 0.018 | 0.008 | 0.07 | 2.27 | 1.01 | 0.62 |
| | Base Metal | 2¼ Cr-1Mo | 0.14 | 0.01 | 0.45 | 0.012 | 0.012 | — | 2.33 | 0.96 | — |
| Example 2 | Third Overlay | Type 347 | 0.043 | 0.44 | 1.77 | 0.022 | 0.007 | 11.83 | 20.57 | 0.10 | 0.53 |
| | Second Overlay | Type 309 | 0.054 | 0.26 | 1.44 | 0.020 | 0.006 | 10.89 | 18.72 | — | — |
| | First Overlay | 2¼ Cr-1MoNb | 0.07 | 0.40 | 0.68 | 0.018 | 0.009 | 0.08 | 2.26 | 1.03 | 0.73 |
| | Base Metal | 2¼ C4-1Mo | 0.15 | 0.18 | 0.56 | 0.006 | 0.007 | — | 2.39 | 1.02 | — |
| Example 3 | Second Overlay | Type 430 Nb | 0.05 | 0.52 | 0.52 | 0.020 | 0.010 | — | 13.54 | — | 0.60 |
| | First Overlay | 1¼ Cr-½MoNb | 0.06 | 0.63 | 0.72 | 0.015 | 0.009 | — | 1.43 | 0.55 | 0.58 |
| | Base Metal | 1¼ Cr-½Mo | 0.16 | 0.52 | 0.56 | 0.012 | 0.012 | — | 1.32 | 0.47 | — |

TABLE 2

| | CHEMICAL COMPOSITION (%) OF STAINLESS STEEL OVERLAY STEEL | | | | | | | | | | |
|---|---|---|---|---|---|---|---|---|---|---|---|
| | Class | Material | C | Si | Mn | P | S | Ni | Cr | Mo | Nb |
| Example 4 | Second Overlay | Type 347 | 0.040 | 0.67 | 1.75 | 0.018 | 0.009 | 10.10 | 19.21 | — | 0.76 |
| | First Overlay | 2¼Cr-1MoNiNb | 0.06 | 0.12 | 0.63 | 0.011 | 0.010 | 0.47 | 2.30 | 1.10 | 0.65 |
| | Base Metal | 2¼Cr-1Mo | 0.14 | 0.01 | 0.45 | 0.012 | 0.012 | — | 2.33 | 0.96 | — |
| Example 5 | Third Overlay | Type 347 | 0.041 | 0.45 | 1.67 | 0.017 | 0.008 | 10.63 | 19.56 | — | 0.52 |
| | Second Overlay | Type 309 | 0.053 | 0.25 | 1.53 | 0.019 | 0.007 | 10.59 | 18.93 | — | — |
| | First Overlay | 2¼Cr-1MoNiNb | 0.06 | 0.13 | 0.59 | 0.011 | 0.009 | 0.34 | 2.28 | 1.01 | 0.61 |
| | Base Metal | 2¼Cr-1Mo | 0.14 | 0.01 | 0.45 | 0.012 | 0.012 | — | 2.33 | 0.96 | — |
| Example 6 | Second Overlay | Type 430 Nb | 0.05 | 0.52 | 0.52 | 0.020 | 0.010 | — | 13.54 | — | 0.60 |
| | First Overlay | 1¼Cr-1MoNiNb | 0.06 | 0.53 | 0.72 | 0.015 | 0.009 | 0.53 | 1.43 | 0.55 | 0.58 |
| | Base Metal | 1¼Cr-½Mo | 0.16 | 0.52 | 0.56 | 0.012 | 0.012 | — | 1.32 | 0.47 | — |
| Comparison 1 | First Overlay | Type 347 | 0.054 | 0.79 | 1.67 | 0.020 | 0.011 | 10.20 | 19.80 | — | 0.65 |
| | Base Metal | 2¼Cr-1Mo | 0.14 | 0.01 | 0.45 | 0.012 | 0.012 | — | 2.33 | 0.96 | — |
| Comparison 2 | Second Overlay | Type 347 | 0.042 | 0.51 | 1.57 | 0.018 | 0.011 | 10.57 | 19.46 | — | 0.60 |
| | First Overlay | Type 309 | 0.047 | 0.50 | 1.65 | 0.023 | 0.009 | 10.12 | 18.92 | — | — |
| | Base Metal | 2¼Cr-1Mo | 0.14 | 0.01 | 0.44 | 0.012 | 0.013 | — | 2.32 | 0.93 | — |

TABLE 3

EXFOLIATION EXPERIMENTS OF STAINLESS STEEL OVERLAY

| Material | | After-Heat at 690° C. (hours) | | | |
|---|---|---|---|---|---|
| Overlay | Base Metal | 5 | 15 | 30 | 100 |
| Example 1 | Type 347 2¼Cr-1MoNb | 2¼Cr-1Mo | — | — | — | — |
| Example 2 | Type 347 Type 309 2¼Cr-1MoNb | 2¼Cr-1Mo | — | — | — | — |
| Example 3 | Type 430 Nb 1¼Cr-½MoNb | 1¼Cr-½Mo | — | — | — | — |
| Comparison 1 | Type 347 | 2¼Cr-1Mo | x | x | x | x |
| Comparison 2 | Type 347 Type 309 | 2¼Cr-1Mo | x | x | x | x |

1 Hydrogen Pressure 150 kg/cm², heat temperature 450° C., air cooling after 24 hours heat maintenance.
2 Exfoliation is detected by Supersonic Damage Examination, Dimension of sample 45 × 55 × 110 mm.
3 —: no exfoliation; x: exfoliation.

TABLE 4

EXFOLIATION AND BENDING EXPERIMENTS OF STAINLESS STEEL OVERLAY

| Material | | | After-Heat at 690° C. (hours) | | | |
|---|---|---|---|---|---|---|
| Overlay | Base Metal | Examination | 5 | 15 | 30 | 100 |
| Example 4 Type 347 2¼Cr-1MoNbNi | 2¼Cr-1Mo | Exfoliation Side Bend | — Excellent | — Excellent | — Excellent | — Excellent |

TABLE 4-continued

EXFOLIATION AND BENDING EXPERIMENTS OF STAINLESS STEEL OVERLAY

| | Material | | | After-Heat at 690° C. (hours) | | | |
|---|---|---|---|---|---|---|---|
| | Overlay | Base Metal | Examination | 5 | 15 | 30 | 100 |
| Example 5 | Type 347 Type 309 2¼Cr-1MoNbNi | 2¼Cr-1Mo | Exfoliation Side Bend | — Excellent | — Excellent | — Excellent | — Excellent |
| Example 6 | Type 430 Nb 1¼Cr-½MoNbNi | 1¼Cr-½Mo | Exfoliation Side Bend | — Excellent | — Excellent | — Excellent | — Excellent |
| Comparison 1 | Type 347 | 2¼Cr-1Mo | Exfoliation Side Bend | x Excellent | x Excellent | x Excellent | x Excellent |
| Comparison 2 | Type 347 Type 309 | 2¼Cr-1Mo | Exfoliation Side Bend | x Excellent | x Excellent | x Excellent | x Excellent |

1 Hydrogen Pressure 150 kg/cm$^2$, heat temp. 450° C., air cooling after 24 hours heat maintenance.
2 Exfoliation is detected by supersonic damage examination.
3 —: No Exfoliation;
x: Exfoliation
4 Bending Radius R = 2t, Bending Angle 180°, Thickness of Sample 10 mm.

As described above, an object of the present invention, namely the reduction and elimination of exfoliation of the stainless overlay weld metal, is accomplished by preventing the hydrogen brittleness attributed to the carbide eduction which occurs in the interface layer between the weld metal and the base metal during the heat process after welding. It is therefore possible to considerably enhance the exfoliation or disbonding resistance of the overlay of the austenitic stainless steel and the overlay of the ferritic stainless steel. Furthermore, the resistance effect is remarkable in the case of the first layer metal welded to the base metal, having a composition similar to the base metal and is a low alloy metal.

It should be noted that the prevention of the exfoliation of the overlay welding according to the present invention is materially different from the unexamined published Japanese Patent Application No. 52-138952 described above. The prior art Japanese Application discloses that ferritic stainless steel is overlaid by welding as a first overlay and then austenitic stainless steel is overlaid by welding after a second layer.

Further, in the present invention, it is possible to employ overlay weld metal which is excellent in ductility and tenacity. Therefore, even if a surface crack is generated in the overlay weld metal, the crack is effectively prevented from propagating to the inside of the base metal. Accordingly, a pressure vessel employing the overlay welding according to the present invention exhibits much more safety in hard conditions than one according to the prior art disclosed in the above cited Japanese Patent Application.

In the case where the underlay weld metal in which the carbon transmission to the interface and tenacity is excellent, exfoliation protection of the overlay of the austenitic or ferritic stainless steel is remarkably enhanced. Incidentally, the effect of niobium and nickel therein is remarkable in chrome-molybdenum steel in which a first layer welded on the base metal has a chemical composition similar to the base metal.

In addition to the above described Patent Application, this invention should be compared to the welding method between different steel materials as disclosed in Japanese Patent Publication No. 46-4054. This Publication discloses a method of preventing generation of a decarbonized layer and a carburizing layer when welding against a different metal containing more chrome than the base metal. The method forms an intermediate layer on the base metal between the base metal and weld metal used as a bonding steel containing Cb 0.15 to 2.0% and Al 0.01 to 0.3%, or Cb 0.15 to 2.0%, Al 0.01 to 0.3%, and Ti 0.01 to 0.5%.

In contrast, an object of the present invention is to prevent exfoliation of the stainless overlay weld metal due to hydrogen. In view of this, appropriate materials are crucial and predetermined. Also, the present invention differs from the Publication in its choice of materials. Namely, it is a feature of the present invention to employ a high tenacity and high mechanical strength weld metal composed of chrome-molybdenum steel containing niobium and/or nickel. However, in the Publication No. 46-4054, columbium and aluminum or columbium, aluminum and titanium are added to chrome-containing steel to form the weld metal. As compared with the Publication, it is a feature of the present invention to obtain a weld metal without a non-metallic intermedium attributed to aluminum and titanium.

Further, it is a feature of the present invention to have substantially the same mechanical characteristics as those of the basic material that is, sufficient ductility and tenacity are obtained by using nickel in the weld metal for good mechanical strength.

As is clear from the above, the present invention prevents exfoliation of the stainless overlay weld metal due to hydrogen and at the same time exhibits good mechanical characteristics. With respect to the underlay weld metal which is required for this improvement, the present invention is novel. Accordingly, the present invention departs significantly from Publication 46-4054 which merely provides a method for solving the mechanical characteristics problem. It is therefore clear that the present invention differs from the Publication in object, composition and resultant effects.

As mentioned above, according to the present invention, a hard carbide layer is not formed in the fused portion of the second stainless steel layer of the stainless steel overlay steel, and an intergranular carbide is not educed in the stainless steel. Hence, exfoliation resistance against the invasion of hydrogen is extremely strong. The present invention is a practical way to prevent stainless steel overlay exfoliation.

Accordingly, when the overlay of the present invention is applied to a tank or vessel in which high pressure and temperature hydrogen is used or stored, since the exfoliation resistance of the stainless steel overlay is excellent, accidents or trouble due to exfoliation of the overlay is reduced even under hard service conditions. The reliability of the safety operations in chemical plants is therefore extremely enhanced.

It is apparent that variations of this invention are possible without departing from the scope thereof.

What is claimed is:

1. A method of welding for prevention of exfoliation of a stainless steel weld overlay metal on a base metal comprising the steps of:
   under-laying by welding at least one low alloy steel layer having substantially the same chemical composition as the base metal, said low alloy steel containing niobium of at least eight times the quantity percentage of carbon in the low alloy steel; and
   overlaying by welding at least one low austenitic or ferritic stainless steel layer on said underlaid layer, whereby exfoliation of the stainless steel overlay is effectively prevented;
   and wherein said base metal defines a surface of a pressure vessel, said pressure vessel containing hydrogen at a partial pressure of 150 kg/cm$^2$ or less at a temperature of 450° C. or less and the exfoliation of the stainless steel overlay is due to hydrogen.

2. A method as defined in claim 1, wherein the underlaid low alloy metal further includes nickel.

3. A method as defined in claims 1 or 2, wherein the underlaid low alloy metal further includes carbon 0.1% or less, silicon 1.0% or less, manganese 1.0% or less, chrome 3.5% or less, molybdenum 1.5% or less, niobium 1.2% or less, and the remainder iron with or without incidental impurities.

4. A method as defined in claim 3, wherein nickel is 1.0% or less.

5. A method as defined in claim 2, wherein nickel is 1.0% or less.

* * * * *